US012798364B2

(12) United States Patent
Ning et al.

(10) Patent No.: US 12,798,364 B2
(45) Date of Patent: Nov. 17, 2026

(54) DRIVE ASSEMBLY

(71) Applicant: Illinois Tool Works Inc., Glenview, IL (US)

(72) Inventors: Kangxi Ning, Shanghai (CN); Changsuo Li, Shanghai (CN)

(73) Assignee: Illinois Tool Works Inc., Glenview, IL (US)

( * ) Notice: Subject to any disclaimer, the term of this patent is extended or adjusted under 35 U.S.C. 154(b) by 275 days.

(21) Appl. No.: 18/659,814

(22) Filed: May 9, 2024

(65) Prior Publication Data

US 2024/0383327 A1 Nov. 21, 2024

(30) Foreign Application Priority Data

May 15, 2023 (CN) ........................ 202310545812.3

(51) Int. Cl.
*B60K 15/05* (2006.01)
*E05F 15/622* (2015.01)
(Continued)

(52) U.S. Cl.
CPC ............ *B60K 15/05* (2013.01); *E05F 15/622* (2015.01); *E05F 15/652* (2015.01);
(Continued)

(58) Field of Classification Search
CPC ............ B60K 15/05; B60K 2015/0523; B60K 2015/015; B60K 2015/053;
(Continued)

(56) References Cited

U.S. PATENT DOCUMENTS

2014/0084620 A1* 3/2014 Frommann ............ B60K 15/05 296/97.22
2021/0381297 A1* 12/2021 Yang ..................... E05F 15/646
(Continued)

FOREIGN PATENT DOCUMENTS

CN 112046620 A 12/2020

OTHER PUBLICATIONS

English translation of CN112046620A; https://translationportal.epo.org; Mar. 30, 2026 (Year: 2026).*

*Primary Examiner* — Roger L Pang
(74) *Attorney, Agent, or Firm* — McAndrews, Held & Malloy, Ltd.

(57) ABSTRACT

The present disclosure provides a driving assembly. The driving assembly includes a driving rod, a driven member and a limit structure. The driving rod has an axis and is rotatable about the axis in a forward direction and in a reverse direction. The driving rod and the driven member are configured such that the driving rod is capable of driving the driven member to move backwards and forwards in an axis direction of the driving rod when the driving rod rotates in the forward direction and the reverse direction, the driven member having a closed position and an open position in the axis direction of the driving rod. The limit structure is configured such that when the driven member is in the closed position, the limit structure prevents the driven member from moving toward the open position in the axis direction of the driving rod due to an external force. The limit structure of the driving assembly of the present disclosure can prevent the driven member from moving toward the open position due to the external force when the driven member is in the closed position and subjected to the external force.

20 Claims, 15 Drawing Sheets

(51) Int. Cl.
*E05F 15/652* (2015.01)
*E05F 15/662* (2015.01)

(52) U.S. Cl.
CPC .... *E05F 15/662* (2015.01); *B60K 2015/0523* (2013.01); *E05Y 2900/534* (2013.01)

(58) Field of Classification Search
CPC ....... B60K 2015/0538; E05Y 2900/534; E05F 15/622; E05F 15/603; E05F 15/611; E05F 15/616; F16H 25/20
USPC ....................................... 296/97.22; 74/89.23
See application file for complete search history.

(56) References Cited

U.S. PATENT DOCUMENTS

| | | | | |
|---|---|---|---|---|
| 2022/0268077 | A1* | 8/2022 | Rudolf | E05F 11/34 |
| 2023/0296164 | A1* | 9/2023 | Yamasaki | F16C 29/0688<br>74/89.23 |
| 2023/0349219 | A1* | 11/2023 | Zhao | E05F 15/622 |

* cited by examiner

DRIVE ASSEMBLY

RELATED APPLICATION

The present application claims the benefit of Chinese Patent Application No. 202310545812.3, filed May 15, 2023, titled "Drive Assembly," the contents of which are hereby incorporated by reference.

TECHNICAL FIELD

The present disclosure relates to a driving assembly, and in particular to a driving assembly for driving a cover.

BACKGROUND

A driving assembly is configured to drive a driven member (for example, a cover) to move. The driven member has an open position and a closed position and is movable between the open position and the closed position. The driven member in the closed position may move from the closed position to the open position when subjected to an external force, and thus the driven member is opened undesirably.

SUMMARY OF THE DISCLOSURE

The present disclosure relates generally to a driving assembly, substantially as illustrated by and described in connection with at least one of the figures, as set forth more completely in the claims.

BRIEF DESCRIPTION OF THE DRAWINGS

The foregoing and other objects, features, and advantages of the devices, systems, and methods described herein will be apparent from the following description of particular examples thereof, as illustrated in the accompanying figures; where like or similar reference numbers refer to like or similar structures. The figures are not necessarily to scale, emphasis instead being placed upon illustrating the principles of the devices, systems, and methods described herein.

DETAILED DESCRIPTION

Figure 1A:
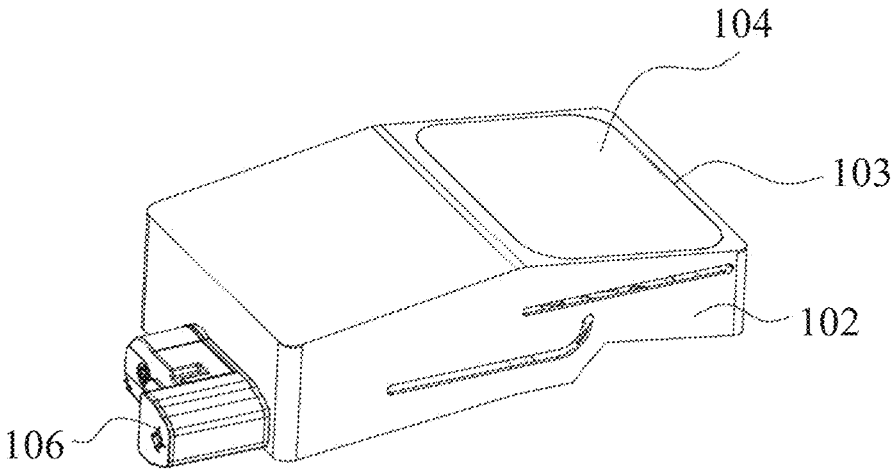
FIG. 1A is a perspective view, viewed from the left front, of a cover assembly of the present disclosure, in which a cover is in a closed cover position.

References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Recitation of ranges of values herein are not intended to be limiting, referring instead individually to any and all values falling within and/or including the range, unless otherwise indicated herein, and each separate value within such a range is incorporated into the specification as if it were individually recited herein. In the following description, it is understood that terms such as "first," "second," "top," "bottom," "side," "front," "back," and the like are words of convenience and are not to be construed as limiting terms. For example, while in some examples a first side is located adjacent or near a second side, the terms "first side" and "second side" do not imply any specific order in which the sides are ordered.

The terms "about," "approximately," "substantially," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the disclosure. The use of any and all examples, or exemplary language ("e.g.," "such as," or the like) provided herein, is intended merely to better illuminate the disclosed examples and does not pose a limitation on the scope of the disclosure. The terms "e.g.," and "for example" set off lists of one or more non-limiting examples, instances, or illustrations. No language in the specification should be construed as indicating any unclaimed element as essential to the practice of the disclosed examples.

The term "and/or" means any one or more of the items in the list joined by "and/or." As an example, "x and/or y" means any element of the three-element set $\{(x), (y), (x, y)\}$.

In other words, "x and/or y" means "one or both of x and y". As another example, "x, y, and/or z" means any element of the seven-element set {(x), (y), (z), (x, y), (x, z), (y, z), (x, y, z)}. In other words, "x, y, and/or z" means "one or more of x, y, and z."

The present disclosure provides a driving assembly, which is configured to drive a driven member to move. For case of the introduction of a specific movement relationship between the driving assembly and the driven member. A cover assembly is taken as an example in the present disclosure for description. In the present disclosure, the driven member is configured to drive a movable part of a vehicle. As an example, the movable part of the vehicle is an exterior trimming cover of the vehicle. The exterior trimming cover of the vehicle comprises a fueling port cover and/or a charging port cover. However, those skilled in the art may appreciate that the driven member in the driving assembly of the present disclosure can drive any member having a closed position and an open position.

The present disclosure provides a driving assembly, which comprises a driving rod, a driven member and a limit structure. The driving rod has an axis and is rotatable about the axis in a forward direction and in a reverse direction. The driving rod and the driven member are configured such that the driving rod is capable of driving the driven member to move backwards and forwards in an axis direction of the driving rod when the driving rod rotates in the forward direction and the reverse direction, the driven member having a closed position and an open position in the axis direction of the driving rod. The limit structure is configured such that when the driven member is in the closed position, the limit structure prevents the driven member from moving toward the open position in the axis direction of the driving rod due to an external force.

According to the above-mentioned driving assembly, the limit structure comprises a limit assembly and a limit block. The limit assembly is provided on the driving rod and is rotatable together with the driving rod, and the limit assembly comprises a blocking member. The limit block is connected to the driven member. The limit assembly is configured such that: when the driven member is in the closed position, the blocking member limits the movement of the limit block to prevent the driven member from moving toward the open position.

According to the above-mentioned driving assembly, the driving rod is provided with a driving engagement structure, the driven member is provided with a driven engagement structure, and the driving rod drives the driven member to move by means of engagement between the driving engagement structure and the driven engagement structure.

According to the above-mentioned driving assembly, the driven member and the driving rod are configured such that: the driving engagement structure and the driven engagement structure have a disengaged state and an engaged state. When the driving engagement structure and the driven engagement structure are in the disengaged state, the driving rod is rotatable about the axis relative to the driven member and does not drive the driven member to move. When the driving engagement structure and the driven engagement structure are in the engaged state, the driving rod is rotatable about the axis and drives the driven member to move.

According to the above-mentioned driving assembly, the limit assembly and the driving rod are configured such that: when the driven member is in the closed position and when the driving engagement structure and the driven engagement structure are in the disengaged state, the blocking member is aligned with the limit block so as to prevent the driven member from moving toward the open position; and when the driving engagement structure and the driven engagement structure are in the engaged state, the blocking member is misaligned with the limit block so as to allow the driven member to move toward the open position.

According to the above-mentioned driving assembly, the driving rod is a screw rod, and the driving engagement structure is an external thread of the screw rod. The driven member comprises a cylindrical portion sleeved on the screw rod, and the driven engagement structure is an internal thread provided on an inner circumference of the cylindrical portion.

According to the above-mentioned driving assembly, the external thread is formed by a threaded tooth, the internal thread is formed by a tooth receiving portion, and a tooth width of the tooth receiving portion is greater than a tooth width of the threaded tooth.

According to the above-mentioned driving assembly, the driving rod is a long rod, and the driving engagement structure is a helical groove provided on the long rod. The driven member is provided with a hollow portion, the long rod is capable of passing through the hollow portion, and the driven engagement structure is a projection provided on an inner circumference of the hollow portion.

According to the above-mentioned driving assembly, a groove width of the helical groove is greater than a width of the projection.

According to the above-mentioned driving assembly, the driven member has the open position in the axis direction of the driving rod. The limit assembly further comprises a ring sleeved on the driving rod and connected to the driving rod. The blocking member is movably connected to the ring and is configured such that: during the movement of the driven member from the open position to the closed position, the blocking member moves relative to the ring to leave a path for the movement of the limit block such that the limit block crosses over the blocking member and moves from one side of the blocking member to the other side of the blocking member.

According to the above-mentioned driving assembly, the blocking member is configured to be movable toward and away from the axis of the driving rod.

According to the above-mentioned driving assembly, the limit assembly further comprises an elastic member. One end of the elastic member abuts against the ring and the other end of the elastic member abuts against the blocking member, such that the blocking member moves away from the axis of the driving rod.

According to the above-mentioned driving assembly, the blocking member has an abutting end and a free end which are opposite to each other, the abutting end abutting against the elastic member, and the free end of the blocking member being provided with an inclined surface. The inclined surface is configured such that: during the movement of the driven member from the open position to the closed position, the limit block presses the inclined surface such that the blocking member moves toward the axis of the driving rod.

According to the above-mentioned driving assembly, the driven member is configured to drive a movable part of a vehicle.

According to the above-mentioned driving assembly, the movable part of the vehicle is an exterior trimming cover of the vehicle, and the exterior trimming cover of the vehicle comprises a fueling port cover and/or a charging port cover.

The limit structure of the driving assembly of the present disclosure can prevent the driven member from moving toward the open position due to the external force when the driven member is in the closed position and subjected to the external force. The limit structure can retain the driven member in the closed position, thereby preventing the driven member from being opened undesirably. During a normal operation, the limit structure allows, by means of the rotation of the driving rod, the driving rod to drive the driven member to move from the closed position to the open position.

Figure 1B:
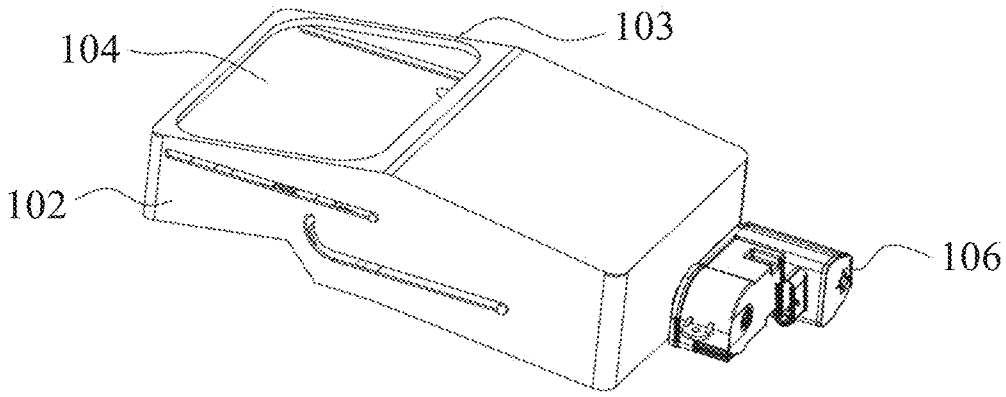
FIG. 1B is a perspective view, viewed from the left rear, of the cover assembly as shown in FIG. 1A, in which the cover is in an open cover position.

FIG. 1A is a perspective view, viewed from the left front, of a cover assembly of the present disclosure, in which a cover 104 is in a closed cover position. FIG. 1B is a perspective view, viewed from the left rear, of the cover assembly as shown in FIG. 1A, in which the cover 104 is in an open cover position. As shown in FIGS. 1A and 1B, the cover assembly comprises a housing 102, the cover 104, and a driving assembly 106. The housing 102 defines an accommodating space. The driving assembly 106 is capable of driving the cover 104 to move relative to the housing 102. Specifically, an opening 103 is provided on the housing 102 and is in communication with the accommodating space. The shape of the cover 104 is adapt to the shape of the opening 103. The cover 104 has a closed cover position and an open cover position. When the cover 104 is in the closed cover position, the cover 104 can close the opening 103. When the cover 104 is in the open cover position, the cover 104 is located in the accommodating space and can expose the opening 103.

Figure 1C:
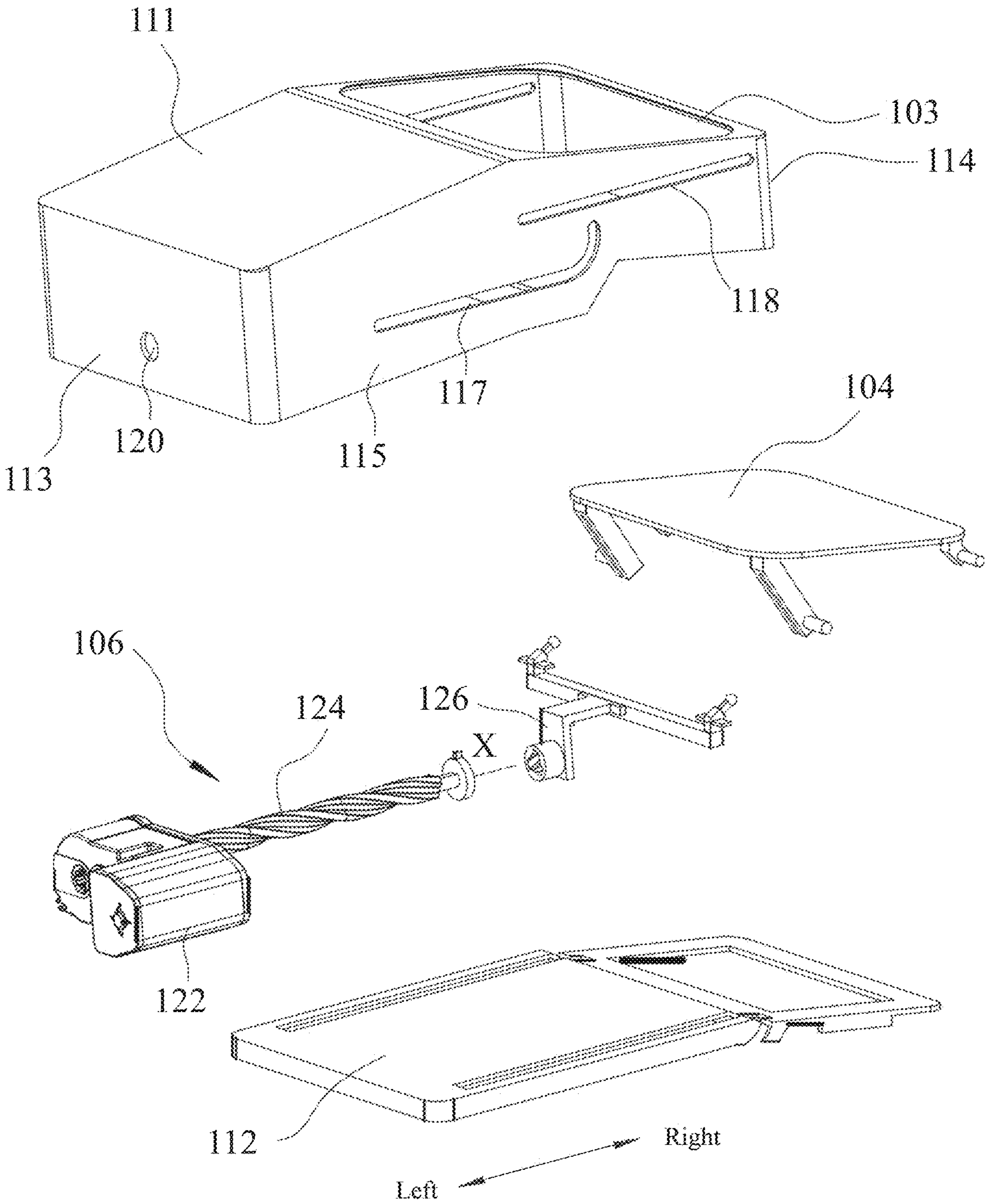
FIG. 1C is an exploded view, viewed from the upper left, of the cover assembly as shown in FIG. 1A.
Figure 1D:
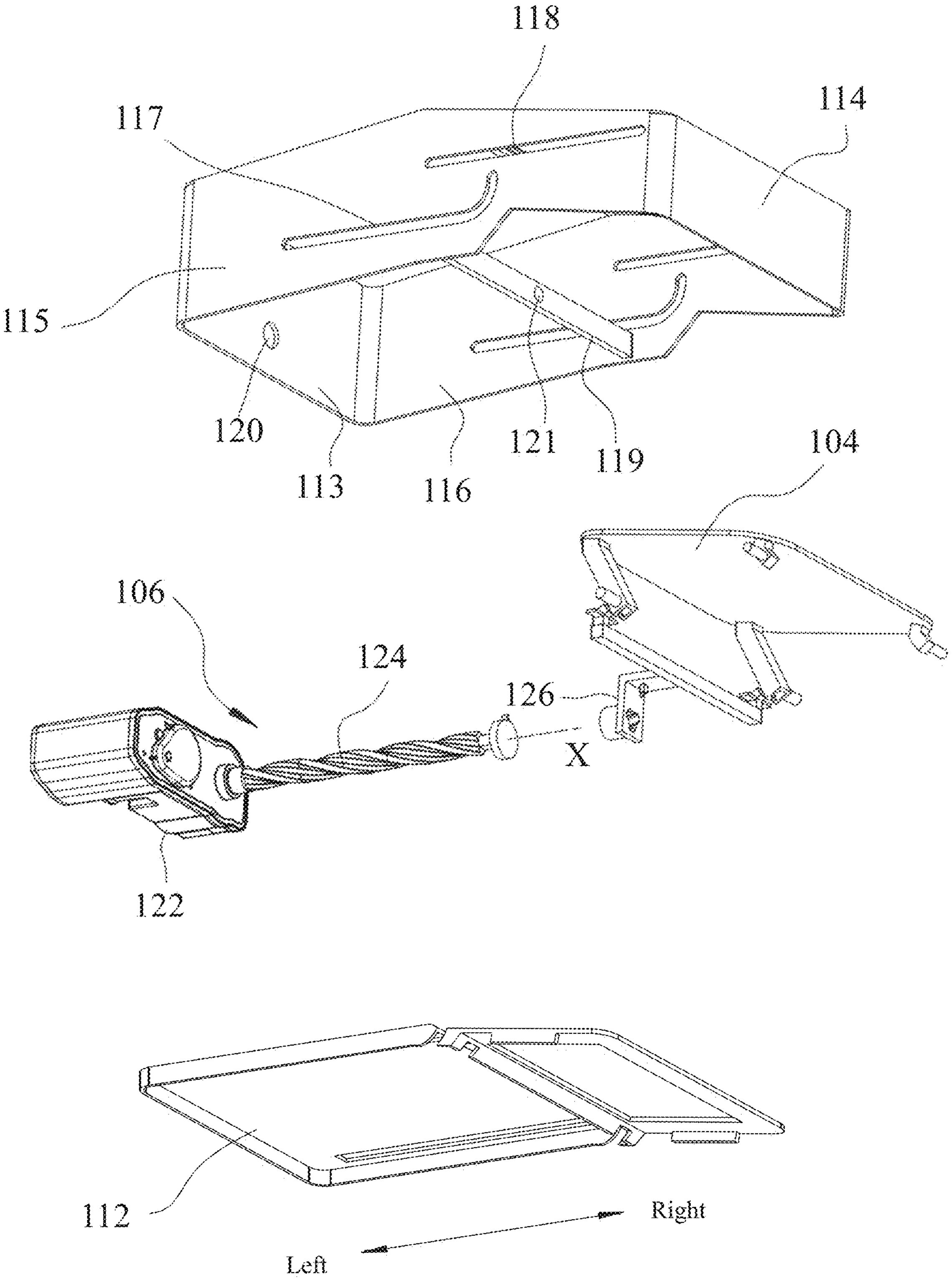
FIG. 1D is an exploded view, viewed from the lower right, of the cover assembly as shown in FIG. 1A.

FIG. 1C is an exploded view, viewed from the upper left, of the cover assembly as shown in FIG. 1A, and FIG. 1D is an exploded view, viewed from the lower right, of the cover assembly as shown in FIG. 1A, which are intended to illustrate a specific structure of the cover assembly. As shown in FIGS. 1C and 1D, the housing 102 substantially is a cube which is hollow internally. The housing 102 comprises a top plate 111 and a bottom plate 112 which are opposite to each other, a left side plate 113 and a right side plate 114 which are opposite to each other, and a front plate 115 and a rear plate 116 which are opposite to each other. The opening 103 is provided on the top plate 111. The front plate 115 and the rear plate 116 are respectively provided with a pair of left guide slots 117 and a pair of right guide slots 118 which are configured to guide the movement of the cover 104. Specifically, the left portions of the front plate 115 and the rear plate 116 are provided with the left guide slots 117. The left guide slot 117 comprises a right arc-shaped segment and a left straight segment which are in communication with each other. The right portions of the front plate 115 and the rear plate 116 are provided with right guide slots 118. The right guide slot 118 is a substantially straight segment. The right guide slot 118 is located above the arc-shaped segment of the left guide slot 117.

As shown in FIG. 1D, a supporting member 119 is further provided on the housing 102. The supporting member 119 is provided in the accommodating space and extends in front and rear directions to be connected to the front plate 115 and the rear plate 116. The left side plate 113 and the supporting member 119 are respectively provided with a left side plate through hole 120 and a supporting member through hole 121. The left side plate through hole 120 and the supporting member through hole 121 respectively run through the left side plate 113 and the supporting member 119 in left and right directions, and are aligned with each other.

As shown in FIGS. 1C and 1D, the driving assembly 106 comprises a driving source 122, a driving rod 124, and a driven member 126. The driving rod 124 has an axis X, and can rotate about the axis X in a forward direction (i.e., clockwise) and in a reverse direction (i.e., counterclockwise). The driving source 122 is connected to the driving rod 124 and can drive the driving rod 124 to rotate about the axis X in the forward direction and in the reverse direction. The driving source 122 is provided on the left side plate 113 and located at the left side of the housing 102. The driving rod 124 passes through the left side plate 113 and the supporting member 119 and is retained in place by the left side plate 113 and the supporting member 119. As an example, the driving source 122 is a motor. The driving rod 124 and the driven member 126 are configured such that the driving rod 124 drives the driven member 126 to move backwards and forwards in the X-axis direction when the driving rod 124 rotates in the forward direction and the reverse direction. The driven member 126 has the closed position and the open position in the X-axis direction. When the driven member 126 is in the closed position, the cover 104 is in the closed cover position; and when the driven member 126 is in the open position, the cover 104 is in the open cover position. The specific structures of the driven member 126 and the cover 104 and the cooperative relationship therebetween will be described with reference to FIG. 2.

Figure 2:
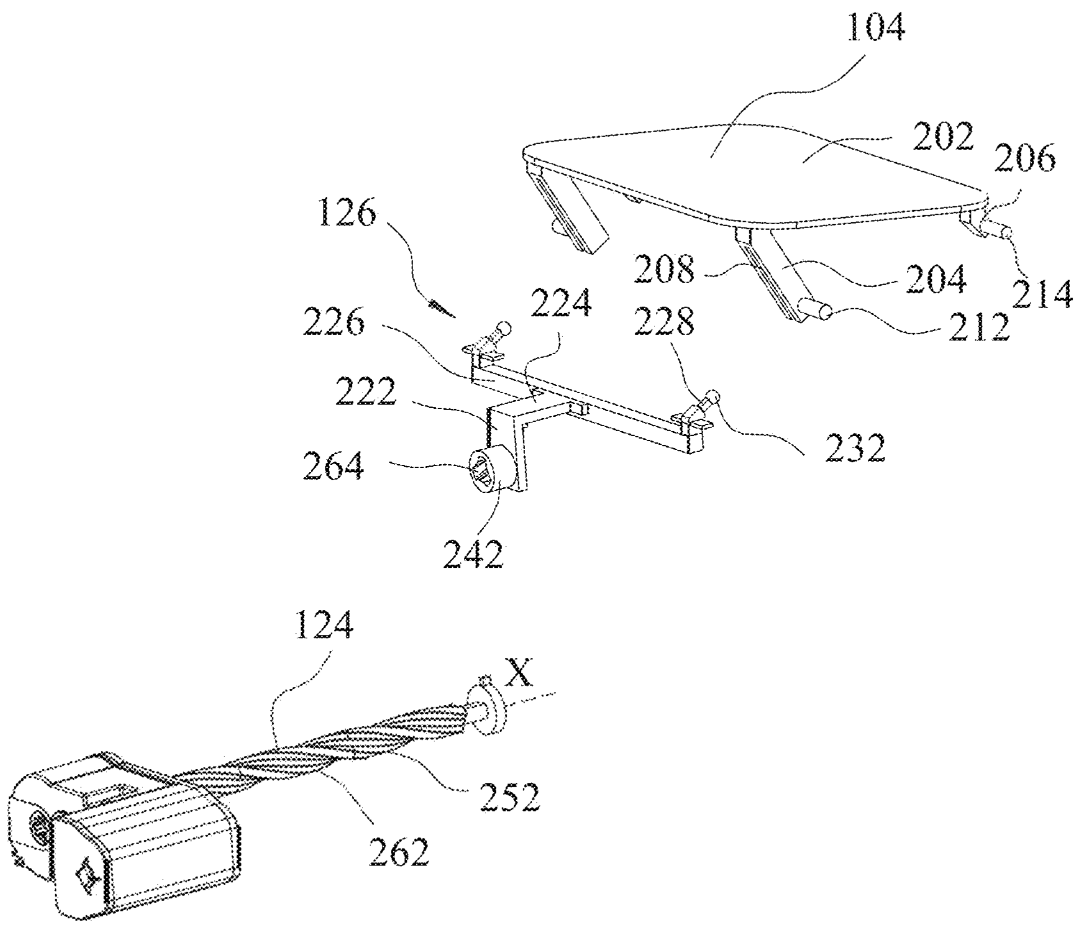
FIG. 2 is an exploded view, viewed from the left front, of the cover and a driven member as shown in FIG. 1C.

FIG. 2 is an exploded view, viewed from the left front, of the cover 104 and the driven member 126 as shown in FIGS. 1C and 1D. As shown in FIG. 2, the cover 104 comprises a cover body 202, two left legs 204, and two right legs 206. The two left legs 204 are provided on the front and rear sides of the left end portion of the cover 104, and are formed by extending obliquely downwardly from the left portion of the cover 104. In other words, the left legs 204 are formed by extending obliquely downwardly from the left end portion of the cover 104 toward the right end portion of the cover 104. The left leg 204 is provided with a guide groove 208. The guide groove 208 extends in a length direction of the left leg 204, and an opening is provided in the left side of the left leg 204 and configured to receive the driven member 126. A left leg supporting member 212 is provided on an outer side of the lower end portion of the left leg 204 (i.e., the front side of the left leg 204 on the front side and the rear side of the left leg 204 on the rear side). The left leg supporting member 212 is formed by extending outwardly from the left leg 204. The left leg supporting member 212 is provided in the left guide slot 117. The arc-shaped segment of the left guide slot 117 can guide the left leg supporting member 212 to move downward and leftward during the movement of the cover 104 from the open cover position to the closed cover position. The straight segment of the left guide slot 117 can guide the left leg supporting member 212 to move leftward during the movement of the cover 104 from the open cover position to the closed cover position. The right legs 206 are provided on the front and rear sides of the right end portion of the cover 104. A right leg supporting member 214 is provided on an outer side of the lower end portion of the right leg 206 (i.e., the front side of the right leg 206 on the front side and the rear side of the right leg 206 on the rear side). The right leg supporting member 214 is formed by extending outwardly from the right leg 206. The right leg supporting member 214 is provided in the right guide slot 118. The right guide slot 118 can guide the right leg supporting member 214 to move leftward during the movement of the cover 104 from the open cover position to the closed cover position.

As shown in FIG. 2, the driven member 126 comprises a vertical plate 222, a transverse plate 224, a transmission rod 226, and two guide elements 228. The transverse plate 224 is arranged between the vertical plate 222 and the transmission rod 226 and is connected to the vertical plate 222 and the transmission rod 226. The transmission rod 226 is formed by extending in the front and rear directions. The transverse plate 224 is connected at the middle portion of the transmission rod 226. The two guide elements 228 are connected opposite to each other at a distal end of the transmission rod 226, and are provided obliquely in the left and right directions. The free ends of the guide elements 228 are higher than the ends of the guide elements 228 that are connected to the transmission rod 226. A guide part 232 is provided at the free end of the guide element 228. The guide part 232 has a substantially spherical shape. The guide part 232 is received in the guide groove 208.

Figure 3:
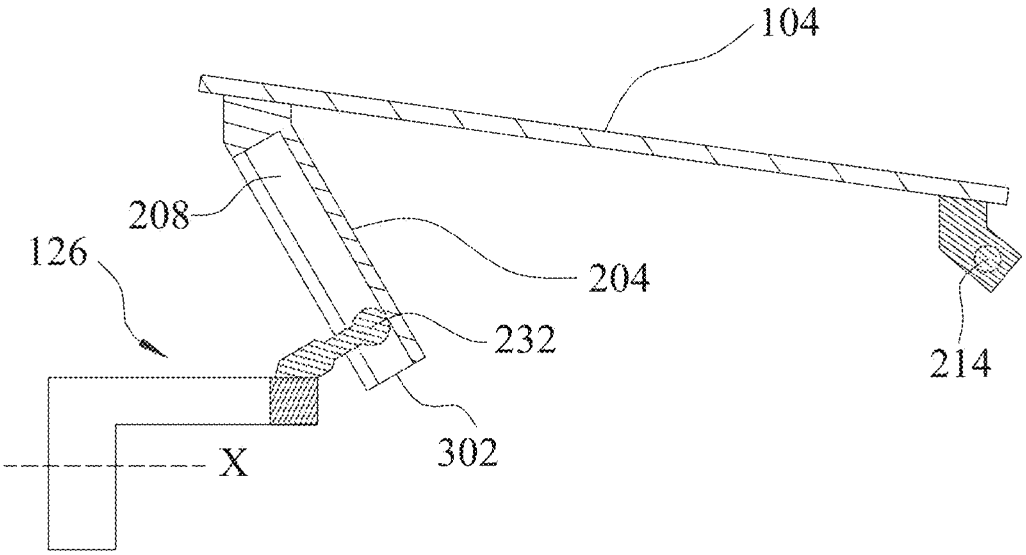
FIG. 3 is a sectional view of cooperation of the cover and the driven member as shown in FIG. 1C.

FIG. 3 is a sectional view of cooperation of the cover 104 and the driven member 126 as shown in FIG. 1C. As shown in FIG. 3, the lower end portion of the left leg 204 is provided with an inlet 302 which is in communication with the guide groove 208, such that the guide part 232 can enter the guide groove 208. When the cover 104 and the driven member 126 are assembled in place, the guide part 232 of the driven member 126 is received in the guide groove 208 of the cover 104, and the movement of the driven member 126 along the axis X (i.e., the left and right directions) can drive the cover 104 to rotate around the right leg supporting member 214, such that the left end portion of the cover 104 is lifted or lowered.

In the present disclosure, the driving rod 124 is provided with a driving engagement structure, and the driven member 126 is provided with a driven engagement structure. The driving rod 124 drives the driven member 126 to move by means of the driving engagement structure and the driven engagement structure. Specifically, the driving rod 124 and the driven member 126 are configured such that: the driving engagement structure and the driven engagement structure have a disengaged state and an engaged state, and when the driving engagement structure and the driven engagement structure are in the disengaged state, the driving rod 124 is rotatable about the axis X relative to the driven member 126 and does not drive the driven member 126 to move; and when the driving engagement structure and the driven engagement structure are in the engaged state, the driving rod 124 is rotatable about the axis X and drives the driven member 126 to move.

Referring to FIG. 2, in a first example of the present disclosure, the driving rod 124 is a screw rod 252, and the driving engagement structure is an external thread of the screw rod 252. The driven member 126 further comprises a cylindrical portion 242. The cylindrical portion 242 is provided on the vertical plate 222. The cylindrical portion 242 has a hollow portion which runs through the vertical plate 222 along the axis X. The cylindrical portion 242 is sleeved on the screw rod 252. The driven engagement structure is an internal thread provided on an inner circumference (i.e., an inner wall of the hollow portion) of the cylindrical portion 242. More specifically, the external thread is formed by three threaded teeth 262, and the internal thread is formed by three tooth receiving portions 264. A tooth width of the tooth receiving portion 264 is greater than a tooth width of the threaded tooth 262, such that when the threaded teeth 262 are received in the tooth receiving portions 264, two threaded tooth side walls of any one threaded tooth 262 of the three threaded teeth 262 in a circumferential direction do not abut against tooth receiving portion side walls of the tooth receiving portions 264 simultaneously. In other words, the screw rod 252 can rotate by a predetermined angle in the cylindrical portion 242, and does not drive the cylindrical portion 242 to move in this process.

Figure 4:
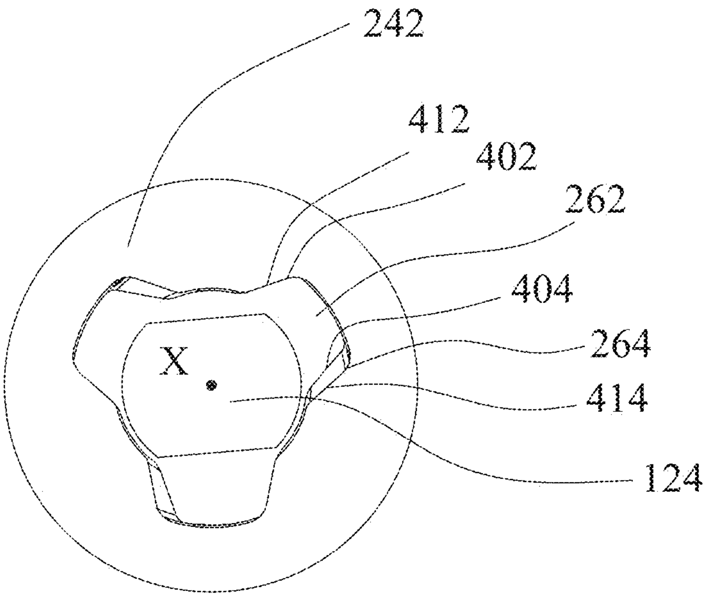
FIG. 4 is a right view of a driving rod and a cylindrical part that are assembled in place.

FIG. 4 is a right view of the driving rod 124 and the cylindrical portion 242 which are assembled in place, which is intended to illustrate the engaged state and the disengaged state of the driving engagement structure and the driven engagement structure. As shown in FIG. 4, the tooth receiving portion 264 has a first tooth receiving portion side wall 402 and a second tooth receiving portion side wall 404 which are opposite to each other in the circumferential direction. The threaded tooth 262 has a first threaded tooth side wall 412 and a second threaded tooth side wall 414 which are opposite to each other in the circumferential direction. The first tooth receiving portion side wall 402 abuts against the first threaded tooth side wall 412, and the second tooth receiving portion side wall 404 is disengaged from the second threaded tooth side wall 414. In this case, when the driving rod 124 rotates about the axis X in the reverse direction (i.e., counterclockwise), since the first tooth receiving portion side wall 402 abuts against the first threaded tooth side wall 412, the driving engagement structure and the driven engagement structure are in the engaged state. In this case, when the driving rod 124 rotates about the axis X in the forward direction (i.e., clockwise), since the second tooth receiving portion side wall 404 is disengaged from the second threaded tooth side wall 414, the driving engagement structure and the driven engagement structure are in the disengaged state. Thus, whether the driving engagement structure and the driven engagement structure are in the engaged state or the disengaged state is related not only to the relative positions of the driving rod 124 and the cylindrical portion 242, but also to the relative rotation directions of the driving rod 124 and the cylindrical portion 242 in this case.

In the present disclosure, the driving assembly further comprises a limit structure. The limit structure is configured such that: when the driven member 126 is in the closed position, the limit structure prevents the driven member 126 from moving toward the open position in the X-axis direction due to an external force.

Figure 5:
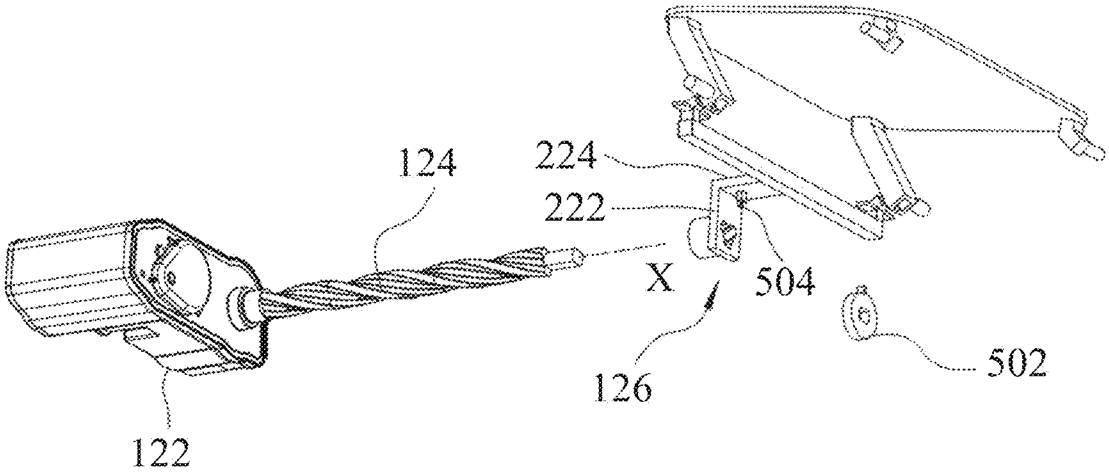
FIG. 5 is a partially exploded view, viewed from the right front, of the cover, a driving assembly and the driven member as shown in FIG. 1C.

FIG. 5 is a partially exploded view, viewed from the right front, of the cover 104, the driving assembly and the driven member 126 as shown in FIG. 1C, which is intended to illustrate a specific example of the limit structure. As shown in FIG. 5, the limit structure of the present disclosure comprises a limit assembly 502 and a limit block 504. The limit assembly 502 is provided at the right end of the driving rod 124 and is connected to the driving rod 124, such that the limit assembly 502 can rotate about the axis X together with the driving rod 124. The limit block 504 is provided on the driven member 126 and connected to the driven member 126. Specifically, the limit block 504 is provided on the transverse plate 224, is connected to the bottom of the transverse plate 224, and extends downward for a certain distance. The limit block 504 is provided on the right side of the vertical plate 222 and is at a certain distance away from the vertical plate 222.

Figure 6:
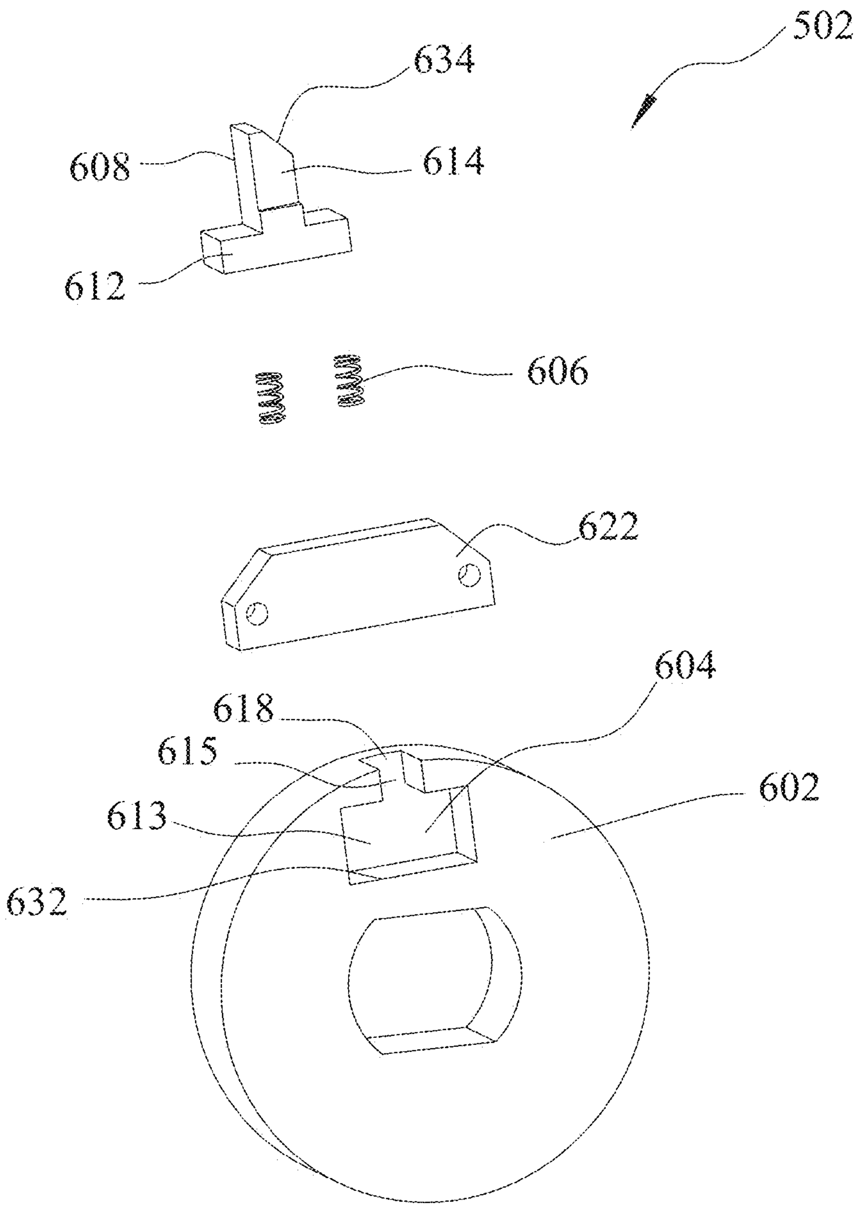
FIG. 6 is an exploded view of a limit assembly, which shows a specific structure of the limit assembly.

FIG. 6 is an exploded view of the limit assembly 502, which is intended to illustrate a specific structure of the limit assembly 502. As shown in FIG. 6, the limit assembly 502 comprises a ring 602, an elastic member 606, a blocking member 608 and a fixing plate 622. The ring 602 is sleeved on the driving rod 124 and connected to the driving rod 124. As an example, the right end portion of the driving rod 124 has a substantially square shape. One pair of opposite sides is straight, and the other pair of opposite sides is arc-shaped. A hole in the ring 602 also has a substantially square shape which matches the right end portion of the driving rod 124. When the ring 602 is sleeved on the driving rod 124, the ring 602 can rotate about the axis X together with the driving rod 124 in the forward direction and the reverse direction. The blocking member 608 is movable toward or away from the axis X relative to the ring 602. Specifically, the ring 602 is provided with a recess 604. The recess 604 is formed by being recessed inwardly from a right surface of the ring 602 and has a cross section substantially in the shape of a Chinese character "凸". The recess 604 comprises a receiving portion 613 and a neck receiving portion 615. The lateral dimension of the neck receiving portion 615 is less than the lateral dimension of the receiving portion 613, such that a step portion is formed to limit the movement of the blocking member 608. The neck receiving portion 615 is provided with an opening 618 in a circumferential direction of the ring 602, such that a free end of the blocking member 608 can extend out of the recess 604 in a radial direction of the ring 602. The blocking member 608 comprises a transverse portion 612 and a longitudinal portion 614 which are connected to each other. The longitudinal portion 614 is located on the transverse portion 612, such that the two portions substantially form an inverted "T" shape. The blocking member 608 has an abutting end and the free end which are opposite to each other. The abutting end is located at the bottom of the transverse portion 612, and the free end is located at the top of the longitudinal portion 614. The receiving portion 613 is configured to receive the transverse portion 612, and the neck receiving portion 615 is configured to receive the longitudinal portion 614. The free end of the longitudinal portion 614 is capable of extending out of the recess 604 through the opening 618 of the neck receiving portion 615. The clastic member 606 is provided in the recess 604. One end of the clastic member 606 abuts against the ring 602 and the other end thereof abuts against the blocking member 608, such that the blocking member 608 moves away from the axis X. Specifically, one end of the elastic member 606 abuts against a bottom wall 632 of the recess 604 opposite to the opening 618, and the other end thereof abuts against the abutting end of the blocking member 608. The clastic member 606 is configured such that a free end of the longitudinal portion 614 is away from the axis X in the radial direction of the ring 602. The fixing plate 622 is provided on the right surface of the ring 602 and is connected to the ring 602 to retain the clastic member 606 and the transverse portion 612 in the recess 604. The free end of the longitudinal portion 614 is provided with an inclined surface 634. The inclined surface 634 is configured such that during the movement of the driven member 126 from the open position to the closed position, the limit block 504 presses the inclined surface 634 such that the blocking member 608 moves toward the axis X.

Figure 7A:
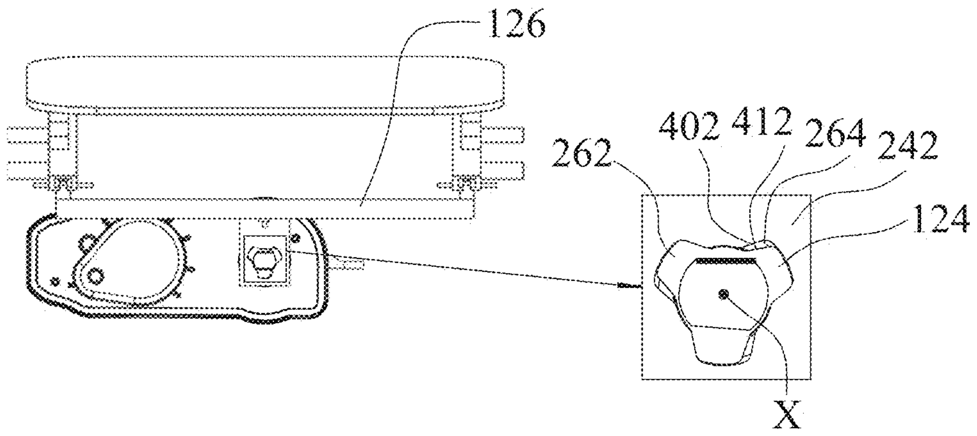
FIGS. 7A, 7B and 7C are schematic diagrams of structures and positional relationships of components when the driven member is in a closed position, the cover is in the closed cover position, and a driving engagement structure and a driven engagement structure are in a disengaged state.
Figure 7B:
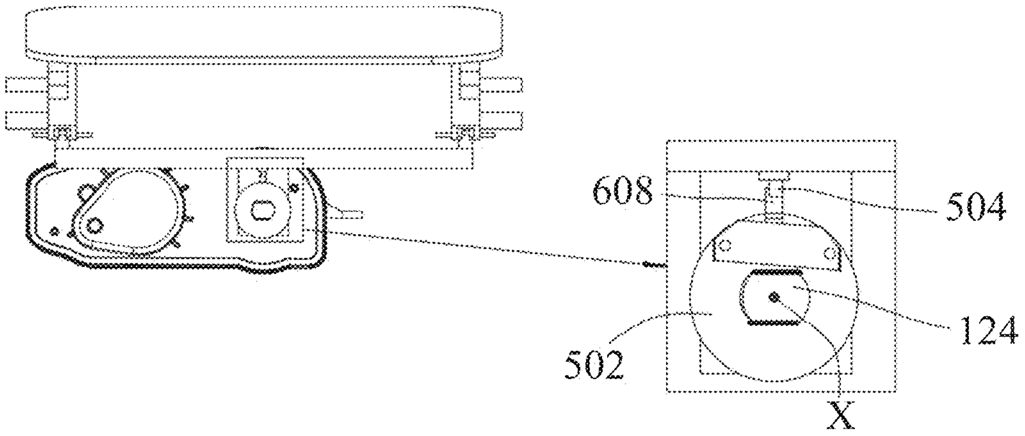
Figure 7C:
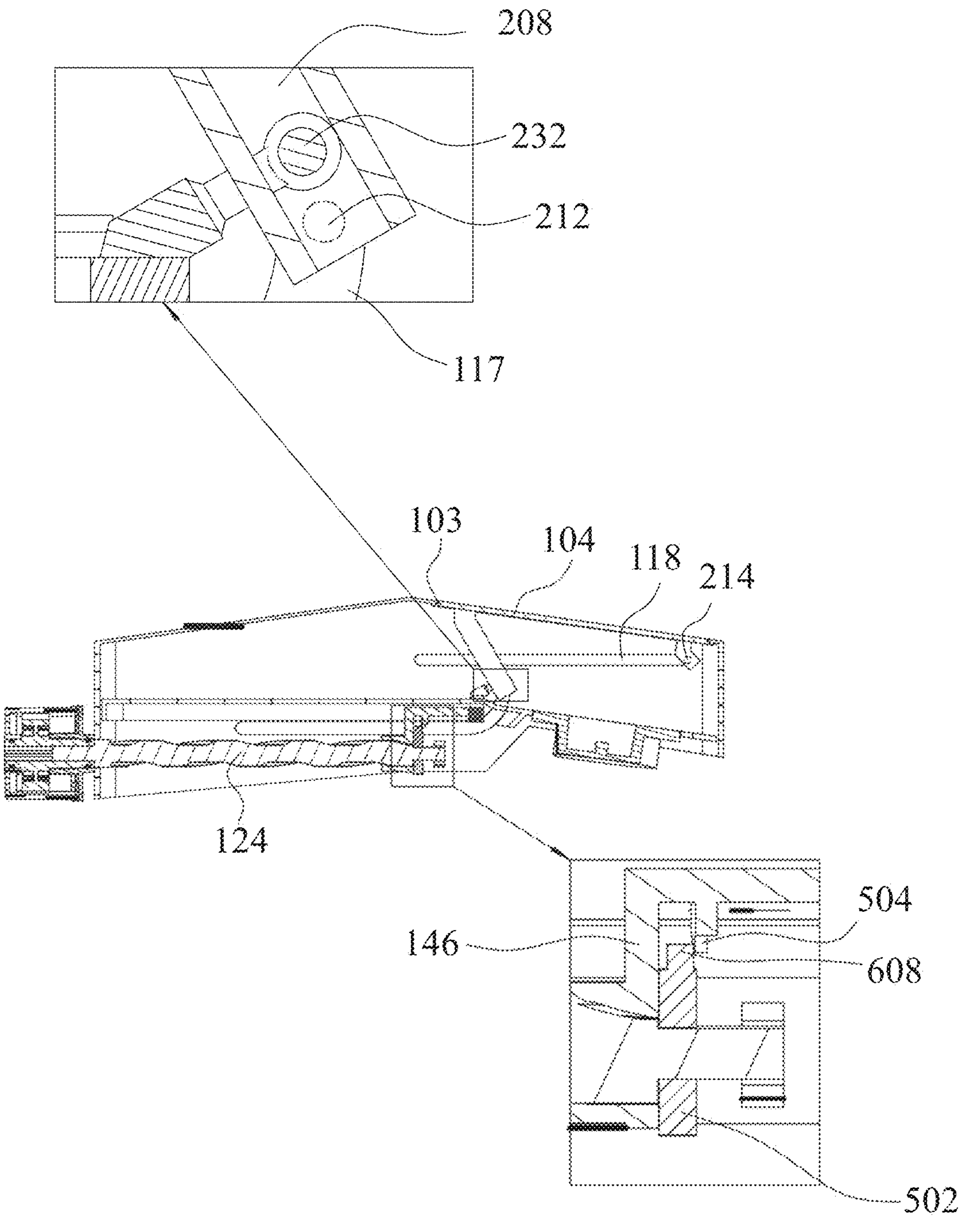

The process of the driven member of the cover assembly of the present disclosure moving from the closed position to the open position will be described below with reference to FIGS. 7A, 7B, 7C, 8A, 8B, 8C and 9. In the present disclosure, the description is given by taking an example in which the driving rod 124 rotates about the axis X in the reverse direction (i.e., counterclockwise) to drive the driven member to move from the closed position to the open position:

FIGS. 7A, 7B and 7C are schematic diagrams of structures and positional relationships of the components when the driven member 126 is in the closed position, the cover 104 is in the closed cover position, and the driving engagement structure and the driven engagement structure are in the disengaged state. FIG. 7A is an enlarged right view of the driving rod 124 and the cylindrical portion 242 of the driven member 126; and FIG. 7B is an enlarged right view of the limit assembly 502 and the limit block 504, and FIG. 7C is a sectional view of the cover assembly, which are intended to illustrate the relative positions of the limit assembly 502 and the limit block 504.

As shown in FIG. 7A, the first tooth receiving portion side wall 402 of the tooth receiving portion 264 is disengaged from the first threaded tooth side wall 412 of the threaded tooth 262. Thus, when the driving rod 124 rotates about the axis X in the reverse direction (i.e., counterclockwise), the driving rod 124 does not drive the driven member 126 to move.

As shown in FIG. 7B, the blocking member 608 of the limit assembly 502 is in a state of being away from the axis X, and the free end of the blocking member 608 is aligned with the limit block 504 in a circumferential direction of the limit assembly 502.

As shown in FIG. 7C, the cover 104 closes the opening 103. The guide part 232 is located substantially at the lower portion of the guide groove 208. The left leg supporting member 212 is located substantially at the right portion of the left guide slot 117, and the right leg supporting member 214 is located substantially at the right portion of the right guide slot 118. The free end of the blocking member 608 is located on the left side of the limit block 504.

Thus, when the driven member 126 is in the closed position and when the cover 104 is pressed by the external force, although the driven member 126 is subjected to the force acting on the cover 104 and accordingly has a tendency to move leftward along the axis X, the blocking member 608 prevents the driven member 126 from moving leftward along the axis X due to the facts that the free end of the blocking member 608 is located on the left side of the limit block 504 and the free end of the blocking member 608 is aligned with the limit block 504. In other words, the blocking member 608 prevents the driven member 126 from moving from the closed position to the open position. Therefore, the driven member 126 can be retained in the closed position, and the cover 104 can be retained in the closed cover position.

Figure 8A:
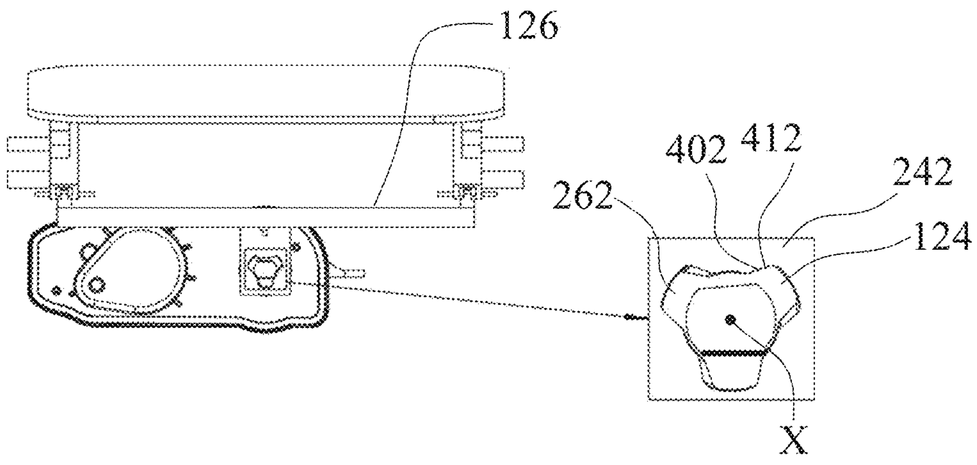
FIGS. 8A, 8B and 8C are schematic diagrams of the structures and the positional relationships of the components when the driven member is in the closed position, the cover is in the closed cover position, and the driving engagement structure and the driven engagement structure are in an engaged state.
Figure 8B:
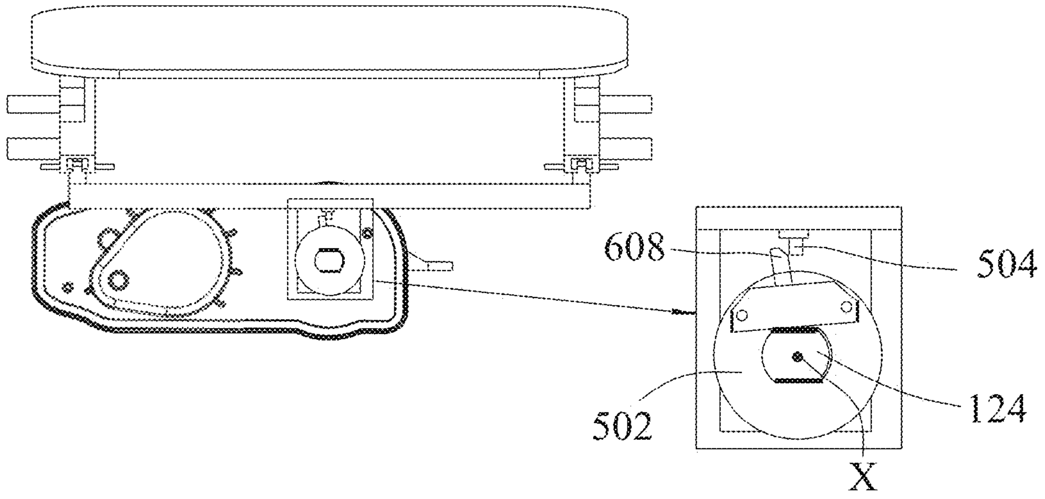
Figure 8C:
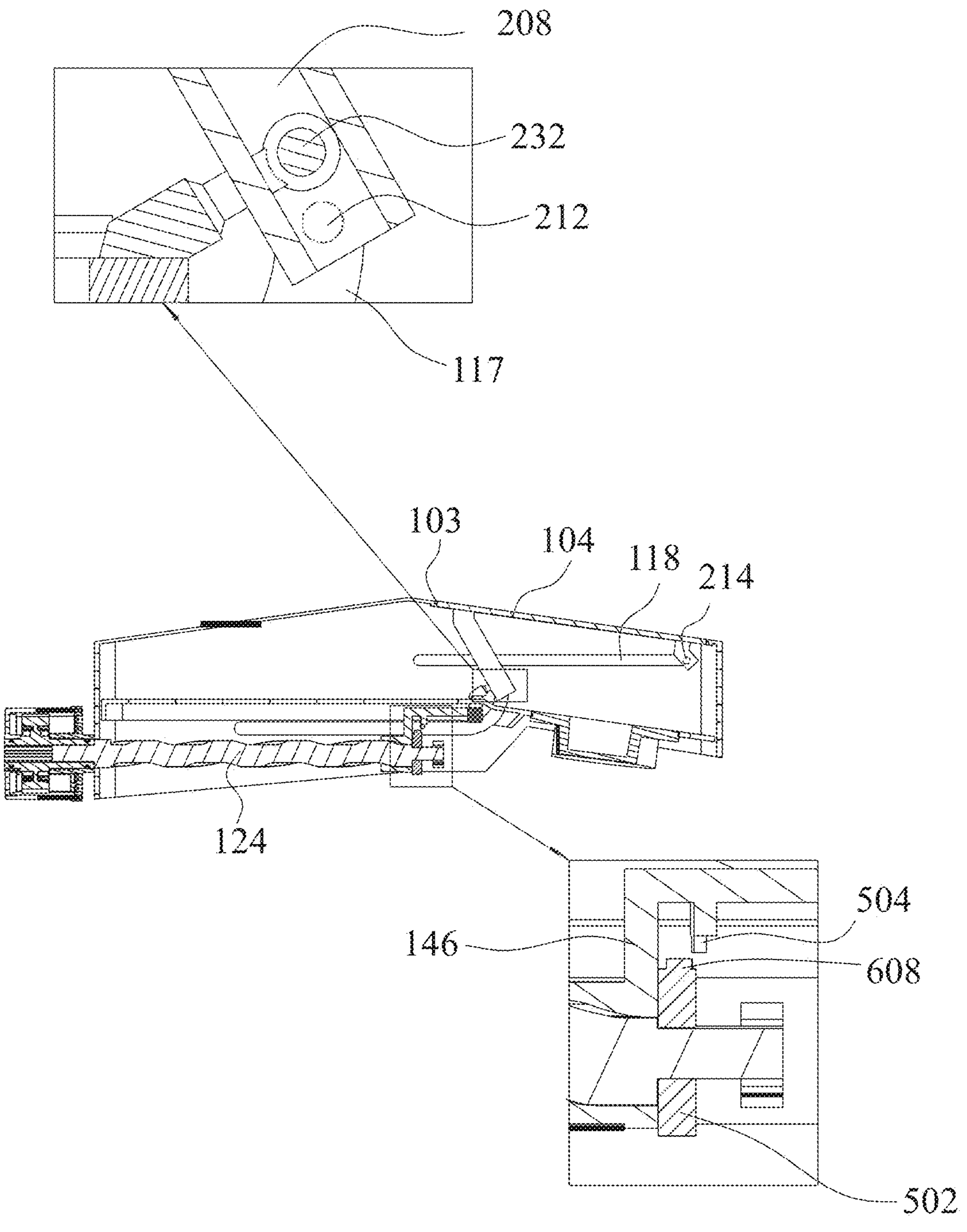

Continuing to refer to FIG. 7A, when the driving rod 124 rotates about the axis X in the reverse direction (i.e., counterclockwise), since the driving engagement structure and the driven engagement structure are in the disengaged state (i.e., the first tooth receiving portion side wall 402 is disengaged from the first threaded tooth side wall 412), the driving rod 124 is rotatable about the axis X in the reverse direction and does not drive the driven member 126 to move until the first tooth receiving portion side wall 402 is engaged with the first threaded tooth side wall 412, as shown in FIGS. 8A, 8B and 8C.

FIGS. 8A, 8B and 8C are schematic diagrams of the structures and the positional relationships of the components when the driven member 126 is in the closed position, the cover 104 is in the closed cover position, and the driving engagement structure and the driven engagement structure are in the engaged state. FIG. 8A is an enlarged right view of the driving rod 124 and the cylindrical portion 242 of the driven member 126; and FIG. 8B is an enlarged right view of the limit assembly 502 and the limit block 504, and FIG. 8C is a sectional view of the cover assembly, which are intended to illustrate the relative positions of the limit assembly 502 and the limit block 504.

As shown in FIG. 8A, the first tooth receiving portion side wall 402 of the tooth receiving portion 264 is engaged with the first threaded tooth side wall 412 of the threaded tooth 262. Thus, when the driving rod 124 rotates about the axis X in the reverse direction (i.e., counterclockwise), each first threaded tooth side wall 412 on the driving rod 124 pushes the first tooth receiving portion side wall 402, thereby allowing the driving rod 124 to drive the driven member 126 to move.

As shown in FIG. 8B, the blocking member 608 of the limit assembly 502 is in the state of being away from the axis X. The blocking member 608 rotates as the driving rod 124 rotates, such that the free end of the blocking member 608 is misaligned with the limit block 504 in the circumferential direction of the limit assembly 502 to allow the driven member 126 to move toward the open position.

As shown in FIG. 8C, the cover 104 closes the opening 103. The guide part 232 is located substantially at the lower portion of the guide groove 208. The left leg supporting member 212 is located substantially at the right portion of the left guide slot 117, and the right leg supporting member 214 is located substantially at the right portion of the right guide slot 118. The free end of the blocking member 608 is located on the left side of the limit block 504. In this case, since the free end of the blocking member 608 is misaligned with the limit block 504, the free end of the blocking member 608 no longer blocks the left side of the limit block 504. Therefore, the reverse (i.e., counterclockwise) rotation of the driving rod 124 about the axis X can drive the driven member 126 to move leftward along the axis. In other words, the reverse rotation of the driving rod 124 about the axis X can drive the driven member 126 to move toward the open position along the axis, such that the driven member 126 drives the cover 104 to move from the closed cover position to the open cover position.

Figure 9:
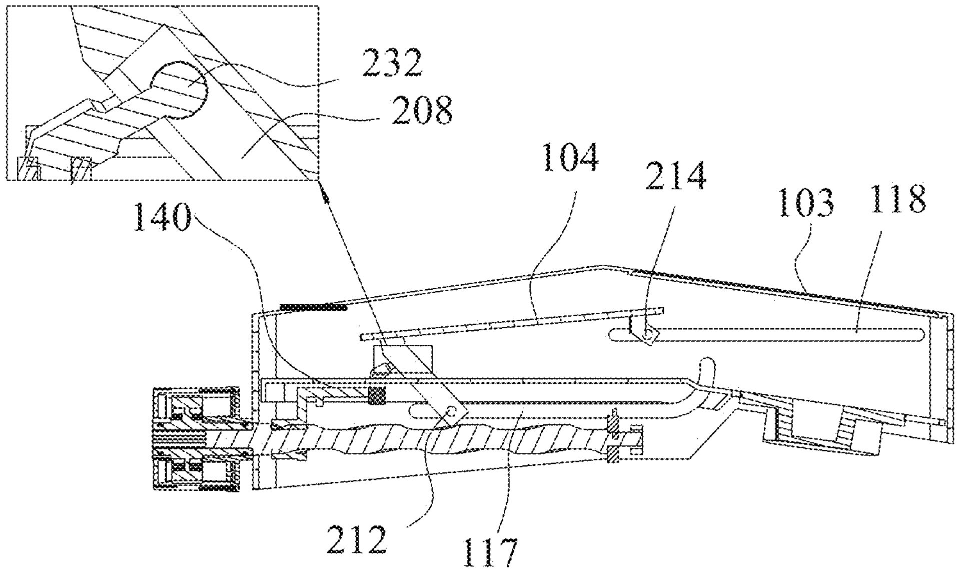
FIG. 9 is a sectional view of the cover assembly of the present disclosure.

FIG. 9 is a sectional view of the cover assembly of the present disclosure, in which the cover 104 is in the open cover position and the driven member 126 is in the open position. As shown in FIG. 9, the cover 104 exposes the opening 103. In other words, the cover 104 is not within a downward projection region of the opening 103. A guide member 101 is located at the left portion of the driving rod 124. The guide part 232 is located at the top of the guide groove 208. The left leg supporting member 212 is located substantially at the left portion of the left guide slot 117, and the right leg supporting member 214 is located substantially at the left portion of the right guide slot 118.

It should be noted that during the movement of the cover 104 from the closed cover position to the open cover position, the driven member 126 moves leftward along the axis X, such that the guide part 232 of the driven member 126 moves leftward along the axis X. The guide part 232 pulls the left end portion of the cover 104 downward (i.e., lowered), such that the cover 104 performs a flipping movement substantially around the right leg supporting member 214. When the cover 104 performs a downward flipping movement, the left leg supporting member 212 of the cover 104 moves along the arc-shaped segment of the left guide slot 117. After the guide part 232 is located at the top of the guide groove 208, the driven member 126 and the cover 104 move leftward together along the axis X until the cover 104 reaches the open cover position.

The process of the cover 104 moving from the open cover position to the closed cover position and the driven member 126 moving from the open position to the closed position is substantially a reverse of the process of the cover 104 moving from the closed cover position to the open cover position and the driven member 126 moving from the closed position to the open position, and a similar part between the two processes will not be described again. It should be noted that at an initial stage of the process of the cover 104 moving from the open cover position to the closed cover position and the driven member 126 moving from the open position to the closed position, the driving engagement structure and the driven engagement structure change from the disengaged state to the engaged state. The initial stage of the process of the driven member of the cover assembly of the present disclosure moving from the closed position to the open position will be described below with reference to FIG. 10. In the present disclosure, the description is given by taking an example in which the driving rod 124 rotates about the axis X in the forward direction (i.e., clockwise) to drive the driven member 126 to move from the closed position to the open position.

Figure 10:
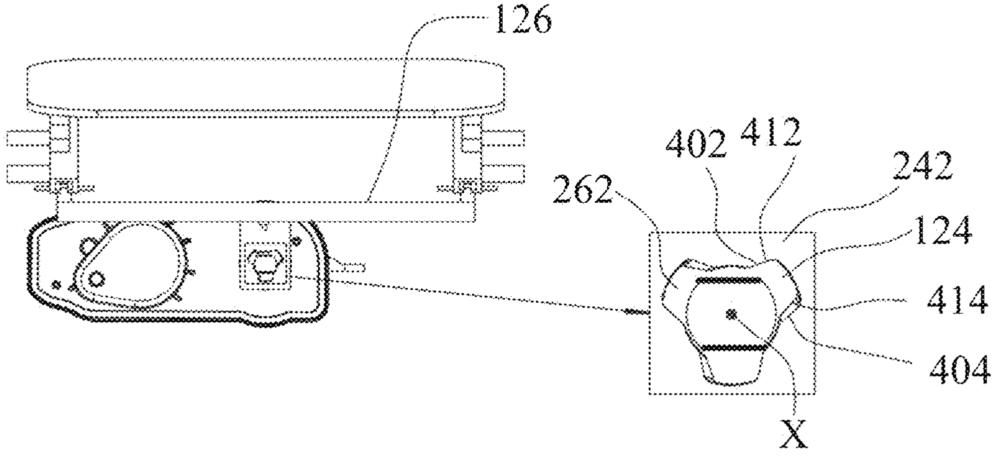
FIG. 10 is an enlarged right view of the driving rod and the cylindrical part of the driven member when the driven member is in an open position, the cover is in the open cover position, and the driving engagement structure and the driven engagement structure are in the disengaged state.

FIG. 10 is an enlarged right view of the driving rod 124 and the cylindrical portion 242 of the driven member 126 when the driven member 126 is in the open position, the cover 104 is in the open cover position, and the driving engagement structure and the driven engagement structure are in the disengaged state. As shown in FIG. 10, since the second tooth receiving portion side wall 404 is disengaged from the second threaded tooth side wall 414, the driving engagement structure and the driven engagement structure are in the disengaged state. When the driving rod 124 rotates about the axis X in the forward direction, the driving rod 124 does not drive the driven member 126 to move until the second threaded tooth side wall 414 is engaged with the second tooth receiving portion side wall 404. After the second threaded tooth side wall 414 is engaged with the second tooth receiving portion side wall 404, the forward rotation of the driving rod 124 about the axis X can drive the driven member 126 to move rightward along the axis X.

In addition, the process of the cover 104 moving from the open cover position to the closed cover position and the driven member 126 moving from the open position to the closed position further includes the process of the blocking member 608 leaving a movement path. The process of the blocking member 608 leaving the movement path will be introduced below with reference to FIGS. 11A and 11B.

Figure 11A:
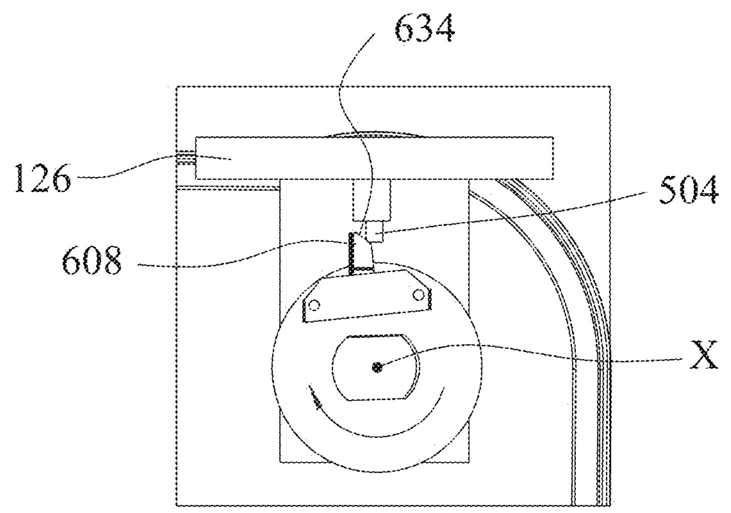
FIGS. 11A and 11B are schematic diagrams showing a process of a limit block abutting against a blocking member during the movement of the driven member from the open position to the closed position.
Figure 11B:
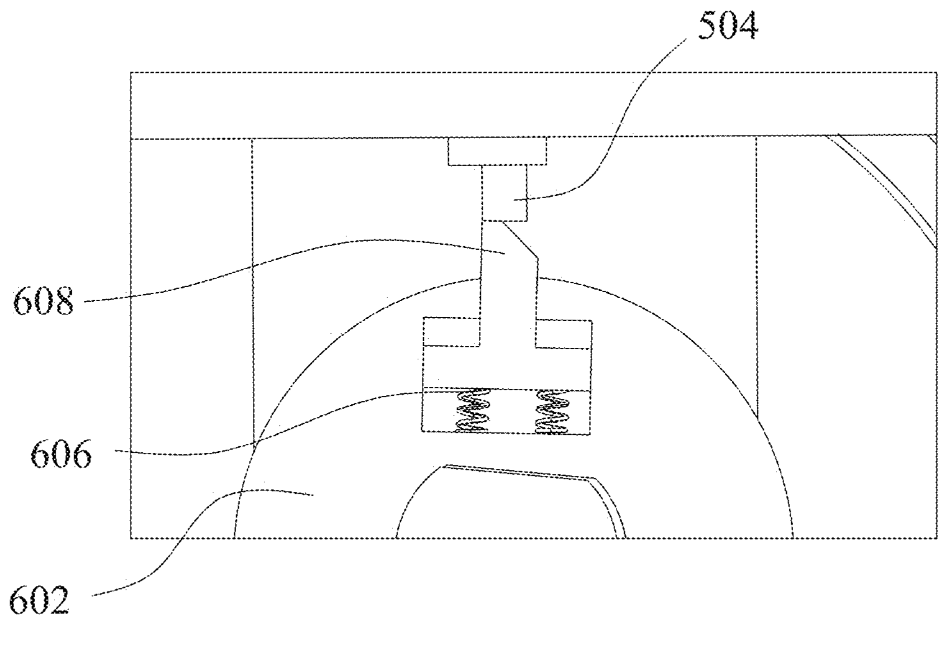

FIGS. 11A and 11B are schematic diagrams showing the process of the limit block 504 abutting against the blocking member 608 during the movement of the driven member 126 from the open position to the closed position. The fixing plate 622 is not shown in FIG. 11B, which is intended to illustrate the elastic member 606. As shown in FIGS. 11A and 11B, during the movement of the driven member 126 from the open position to the closed position, the limit block 504 of the driven member 126 comes into contact with the free end of the blocking member 608. More specifically, when the driving rod 124 rotates about the axis X in the forward direction (i.e., clockwise), the inclined surface 634 on the blocking member 608 abuts against the limit block 504. The limit block 504 applies a force allowing the movement toward the axis X to the blocking member 608, such that the blocking member 608 moves toward the axis X relative to the ring 602. While the blocking member 608 moves toward the axis X, the blocking member 608 moves about the axis X to leave a path for the movement of the limit block 504, such that the limit block 504 crosses over the blocking member 608 and moves from one side of the blocking member 608 to the other side of the blocking member 608. It should be noted that the limit block 504 moves not only from the left side of the blocking member 608 to the right side of the blocking member 608, but also from the front side of the blocking member 608 to the rear side of the blocking member 608. Thus, during the movement of the driven member 126 from the open position to the closed position, the limit block 504 does not hinder the movement of the driven member 126.

Figure 12A:
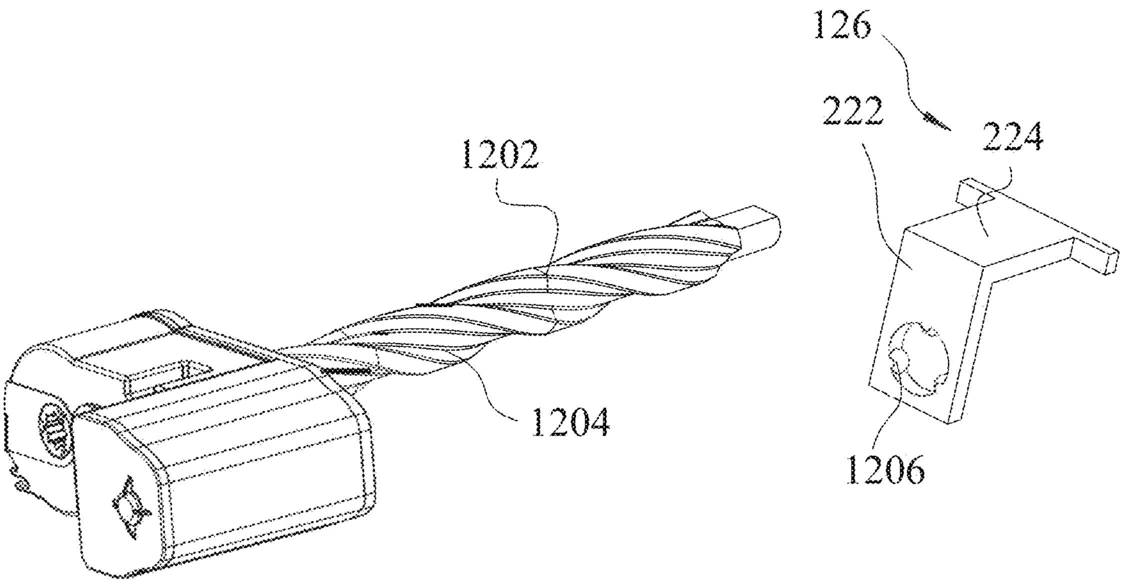
FIG. 12A is a perspective view of the driving rod, the driving engagement structure and the driven engagement structure according to a second example of the present disclosure.
Figure 12B:
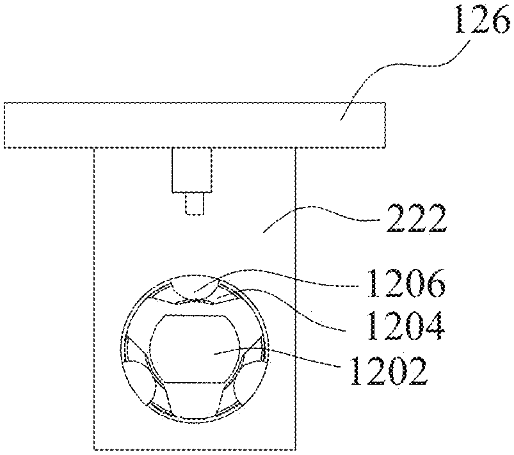
FIG. 12B is a schematic diagram of the driving rod assembled in place with the driven member according to the second example of the present disclosure.

FIG. 12A is a perspective view of the driving rod 124, the driving engagement structure and the driven engagement structure according to a second example of the present disclosure; and FIG. 12B is a schematic diagram of the driving rod 124 assembled in place with the driven member 126 according to the second example of the present disclosure, in which only a part of the driven member 126 is illustrated.

As shown in FIGS. 12A and 12B, the driving rod 124 is a long rod 1202. The driving engagement structure is a helical groove 1204 provided on the long rod 1202. The driven engagement structure is a projection 1206 provided on the inner circumference of the hollow portion. Specifically, the driven member 126 in the second example is substantially the same as the driven member 126 in the first example, and the main differences lie in: in the first example, the driven member 126 comprises the cylindrical portion 242 provided on the vertical plate 222, the cylindrical portion 242 has the hollow portion running through the vertical plate 222 along the axis X, and the driven engagement structure is an internal thread provided on the inner circumference of the cylindrical portion 242; while in the second example, the vertical plate 222 of the driven member 126 is provided with the hollow portion running through the vertical plate 222 along the axis X, and the driven engagement structure is the projection 1206 provided on the inner circumference of the hollow portion. More specifically, three helical grooves 1204 are uniformly provided on an outer circumference of the long rod 1202. The projection 1206 has a substantially spherical shape. The projection 1206 can be received in the corresponding helical groove 1204. The groove width of the helical groove 1204 is greater than the width (i.e., diameter) of the projection 1206, such that when the projection 1206 is received in the helical groove 1204, the side walls of two sides of the projection 1206 in a circumferential direction do not abut against the side walls of two sides of the helical groove 1204 in the circumferential direction simultaneously, thereby achieving the engaged state and the disengaged state of the driving engagement structure and the driven engagement structure described above.

It should be noted that although a specific number of threaded teeth and a specific number of helical grooves are shown in the present disclosure, any number of threaded teeth and any number of helical grooves fall within the scope of protection of the present disclosure.

It should be noted that although the external thread and the internal thread are exemplified and the helical groove and the boss are exemplified in the present disclosure to describe the driving engagement structure and the driven engagement structure, other engagement structures having a disengaged state and an engaged state also fall within the scope of protection of the present disclosure.

The limit structure of the driving assembly of the present disclosure can prevent the driven member from moving toward the open position due to the external force when the driven member is in the closed position and subjected to the external force. The limit structure can retain the driven member in the closed position, thereby preventing the driven member from being opened undesirably. Also, during a normal operation, the limit structure allows, by means of the rotation of the driving rod, the driving rod to drive the driven member to move from the closed position to the open position.

Although the present disclosure is described with reference to the examples of examples outlined above, various alternatives, modifications, variations, improvements and/or substantial equivalents, which are known or anticipated at present or to be anticipated before long, may be obvious to those of at least ordinary skill in the art. Furthermore, the technical effects and/or technical problems described in this description are exemplary rather than limiting. Therefore, the disclosure in this description may be used to solve other technical problems and have other technical effects and/or may solve other technical problems. Accordingly, the examples of the embodiments of the present application as set forth above are intended to be illustrative rather than limiting. Various changes may be made without departing from the spirit or scope of the present application. Therefore, the present application is intended to embrace all known or earlier disclosed alternatives, modifications, variations, improvements and/or substantial equivalents.

What is claimed is:

1. A driving assembly, comprising:

a driving rod having an axis and being rotatable about the axis in a forward direction and in a reverse direction;

a driven member, the driving rod and the driven member being configured such that the driving rod is capable of driving the driven member to move backwards and forwards in an axis direction of the driving rod when the driving rod rotates in the forward direction and the reverse direction, the driven member having a closed position and an open position in the axis direction of the driving rod; and a limit structure configured such that when the driven member is in the closed position, the limit structure prevents the driven member from moving toward the open position in the axis direction of the driving rod due to an external force;

wherein the limit structure comprises:

a limit assembly provided on the driving rod and rotatable together with the driving rod, the limit assembly comprising a blocking member; and a limit block connected to the driven member; wherein the limit assembly is configured such that when the driven member is in the closed position, the blocking member limits movement of the limit block to prevent the driven member from moving toward the open position.

2. The driving assembly of claim 1, wherein the driving rod is provided with a driving engagement structure, the driven member is provided with a driven engagement structure, and the driving rod drives the driven member to move by means of engagement between the driving engagement structure and the driven engagement structure.

3. The driving assembly of claim 2, wherein the driven member and the driving rod are configured such that the driving engagement structure and the driven engagement structure have a disengaged state and an engaged state;

wherein when the driving engagement structure and the driven engagement structure are in the disengaged state, the driving rod is rotatable about the axis relative to the driven member and does not drive the driven member to move; and wherein when the driving engagement structure and the driven engagement structure are in the engaged state, the driving rod is rotatable about the axis and drives the driven member to move.

4. The driving assembly of claim 3, wherein the limit assembly and the driving rod are configured such that: when the driven member is in the closed position and the driving engagement structure and the driven engagement structure are in the disengaged state, the blocking member is aligned with the limit block so as to prevent the driven member from moving toward the open position; and when the driving engagement structure and the driven engagement structure are in the engaged state, the blocking member is misaligned with the limit block so as to allow the driven member to move toward the open position.

5. The driving assembly of claim 4, wherein
the driving rod is a screw rod, and the driving engagement structure is an external thread of the screw rod; and
the driven member comprises a cylindrical portion sleeved on the screw rod, and the driven engagement structure is an internal thread provided on an inner circumference of the cylindrical portion.

6. The driving assembly of claim 5, wherein
the external thread is formed by a threaded tooth, the internal thread is formed by a tooth receiving portion, and a tooth width of the tooth receiving portion is greater than a tooth width of the threaded tooth.

7. The driving assembly of claim 4, wherein
the driving rod is a long rod, and the driving engagement structure is a helical groove provided on the long rod; and
the driven member is provided with a hollow portion, the long rod is capable of passing through the hollow portion, and the driven engagement structure is a projection provided on an inner circumference of the hollow portion.

8. The driving assembly of claim 7, wherein
a groove width of the helical groove is greater than a width of the projection.

9. The driving assembly of claim 6, wherein
the driven member has the open position in the axis direction of the driving rod; the limit assembly further comprises a ring sleeved on the driving rod and connected to the driving rod; and
the blocking member is movably connected to the ring and is configured such that during movement of the driven member from the open position to the closed position, the blocking member moves relative to the ring to leave a path for movement of the limit block such that the limit block crosses over the blocking member and moves from one side of the blocking member to the other side of the blocking member.

10. The driving assembly of claim 9, wherein
the blocking member is configured to be movable toward and away from the axis of the driving rod.

11. The driving assembly of claim 10, wherein
the limit assembly further comprises an elastic member; one end of the elastic member abuts against the ring and the other end of the elastic member abuts against the blocking member, such that the blocking member is biased away from the axis of the driving rod.

12. The driving assembly of claim 11, wherein
the blocking member has an abutting end and a free end which are opposite to each other, the abutting end abutting against the elastic member, and the free end of the blocking member being provided with an inclined surface; and
the inclined surface is configured such that during movement of the driven member from the open position to the closed position, the limit block presses the inclined surface such that the blocking member moves toward the axis of the driving rod.

13. The driving assembly of claim 1, wherein
the driven member is configured to drive a movable part of a vehicle.

14. The driving assembly of claim 13, wherein
the movable part of the vehicle is an exterior trim cover of the vehicle, and the exterior trim cover of the vehicle comprises a fueling port cover, a charging port cover, or both.

15. A driving assembly, comprising:
a driving rod having an axis and being rotatable about the axis in a forward direction and in a reverse direction;
a driven member configured to move backwards and forwards in an axis direction of the driving rod when the driving rod rotates in the forward direction and the reverse direction, the driven member having a closed position and an open position in the axis direction of the driving rod;
a driving engagement structure provided on the driving rod;
a driven engagement structure provided on the driven member, the driving engagement structure and the driven engagement structure having a disengaged state in which the driving rod rotates relative to the driven member without driving the driven member to move, and an engaged state in which rotation of the driving rod drives the driven member to move; and
a limit structure comprising: a limit assembly provided on the driving rod and rotatable together with the driving rod, the limit assembly comprising a ring connected to the driving rod, a blocking member movably connected to the ring so as to be movable toward and away from the axis of the driving rod, and an elastic member biasing the blocking member away from the axis; and a limit block connected to the driven member;
wherein when the driven member is in the closed position and the driving engagement structure and the driven engagement structure are in the disengaged state, the blocking member is aligned with the limit block to prevent the driven member from moving toward the open position due to an external force; and
wherein when the driving engagement structure and the driven engagement structure are in the engaged state, the blocking member is misaligned with the limit block to allow the driven member to move toward the open position.

16. The driving assembly of claim 15, wherein the blocking member has an abutting end abutting against the elastic member and a free end opposite the abutting end, the free end being provided with an inclined surface configured such that during movement of the driven member from the open position to the closed position, the limit block presses the inclined surface to move the blocking member toward the axis of the driving rod, thereby allowing the limit block to cross over the blocking member from one side to the other side.

17. The driving assembly of claim 15, wherein the driving rod is a screw rod having an external thread formed by a plurality of threaded teeth, and the driven member comprises a cylindrical portion sleeved on the screw rod, the cylindrical portion having an internal thread formed by a plurality of tooth receiving portions, wherein a tooth width of each tooth receiving portion is greater than a tooth width of each threaded tooth.

18. The driving assembly of claim 15, wherein the driven member is configured to drive an exterior trim cover of a vehicle between a closed cover position and an open cover position, the exterior trim cover comprising a fueling port cover, a charging port cover, or both.

19. The driving assembly of claim 15, wherein the driven member comprises a vertical plate, a transverse plate connected to the vertical plate, and a transmission rod extending in a front-and-rear direction and connected to the transverse plate, the limit block being connected to the transverse plate and extending away from the transverse plate.

20. A driving assembly, comprising:

a driving rod having an axis and being rotatable about the axis;

a driven member configured to move in an axis direction of the driving rod when the driving rod rotates, the driven member having a closed position and an open position in the axis direction of the driving rod;

a ring connected to the driving rod and rotatable together with the driving rod about the axis;

a blocking member movably connected to the ring so as to be movable toward and away from the axis, the blocking member having a free end provided with an inclined surface;

an elastic member having one end abutting against the ring and another end abutting against the blocking member, the elastic member biasing the blocking member away from the axis; and a limit block connected to the driven member;

wherein when the driven member is in the closed position, the blocking member is positioned such that the free end of the blocking member is aligned with the limit block in a circumferential direction of the ring, thereby preventing the driven member from moving from the closed position toward the open position due to an external force acting on the driven member; and wherein when the driving rod rotates from a first rotational position corresponding to the closed position of the driven member toward a second rotational position, the blocking member rotates with the driving rod such that the free end of the blocking member is misaligned with the limit block in the circumferential direction of the ring, thereby allowing the driven member to move toward the open position.

* * * * *